May 28, 1940.  F. WELTY ET AL  2,202,179
FAUCET
Filed Oct. 15, 1938
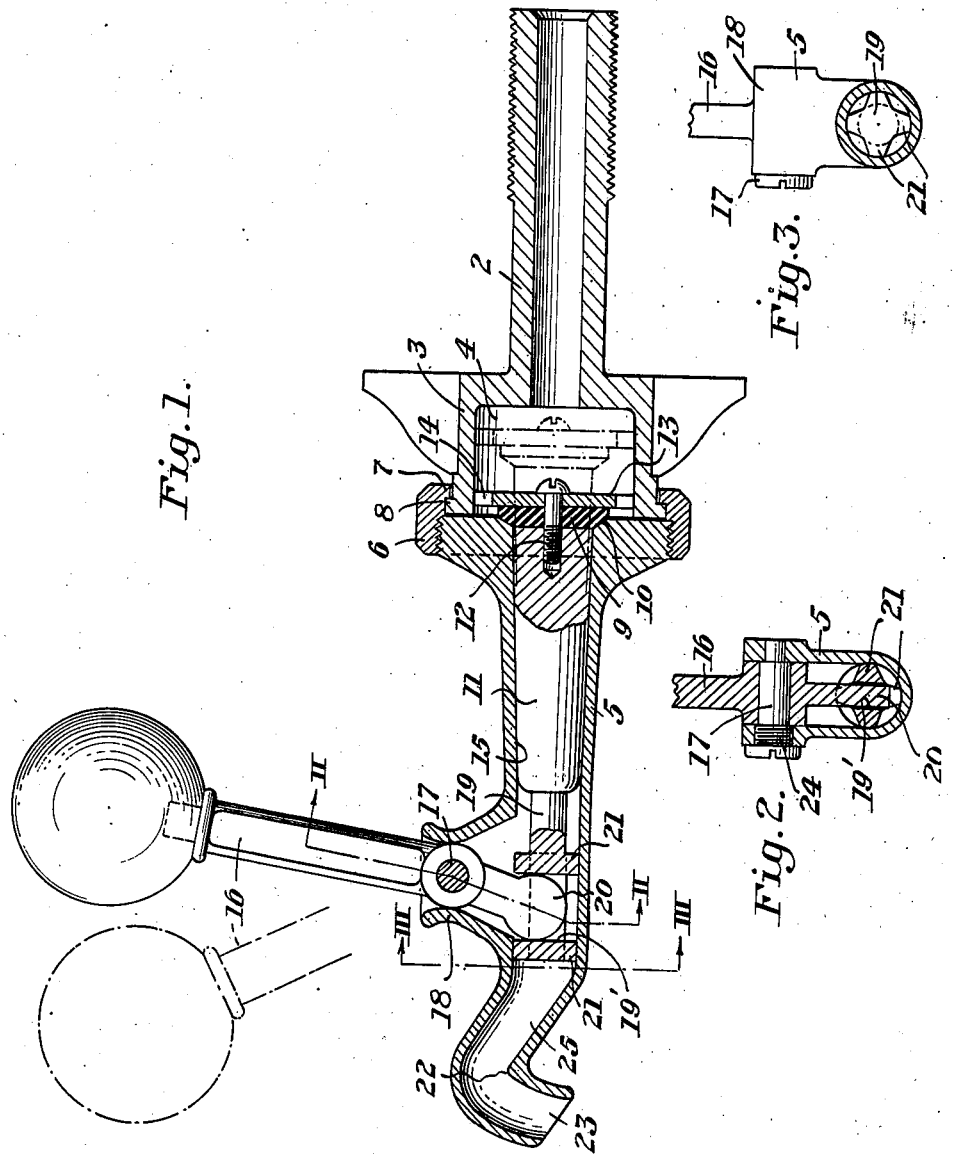
INVENTORS
Frank Welty and
Raymond D. Welty Patented May 28, 1940

2,202,179

UNITED STATES PATENT OFFICE 2,202,179

FAUCET

Frank Welty and Raymond D. Welty,
Youngstown, Ohio

Application October 15, 1938, Serial No. 235,289

8 Claims. (Cl. 225—8)

The present invention relates to faucets and more particularly to faucets for use in the dispensing of carbonated liquids, such as beer, or other liquids which are normally maintained under substantial pressures in order to retain within the liquid a gas which has previously been injected into it. While the present invention is applicable to the dispensing of these other types of liquids, the faucet which we provide is particularly advantageous in the dispensing of beer and, accordingly, it will be described as so applied hereinafter.

In the dispensing of beer the beer is fed by pipe lines from the keg or other container through cooling apparatus to the faucet from which the beer is to be drawn. The beer in the keg and in the cooler and in the lines leading to the faucet is maintained under pressure in order to prevent the escape of the carbonating gas from the beer. A pressure of from approximately 20 to 30 pounds is normally maintained in the beer keg. The pressure in the line leading from the cooler to the faucet is somewhat less than this due to the pressure drop in the line, but even in the line immediately behind the faucet a substantial pressure prevails. As a result of this pressure difficulty has been encountered heretofore in dispensing the beer in such a way as to prevent excessive foaming. This difficulty is encountered even where the faucet handle is moved to the full open position so that the beer may run freely through the faucet. Excessive foaming is encountered to an even greater extent when the faucet handle is in a position between closed position and full open position as the beer passing through the faucet opening is then under greater pressure than when the operating handle is in full open position and this not only causes foaming but also causes spraying of the beer which is, of course, highly objectionable as it causes the carbonated gas to be eliminated from the beer, thus rendering the beer "flat." Considerable difficulty has also been encountered with many of the structures in use at the present time as there is no means provided whereby the rate of flow of the beer through the faucet can be readily and easily regulated so as to permit the drawing of the beer at either a slow or a rapid rate. A separate flow regulating valve operable entirely separately from the control handle has been used but it will be apparent that such a structure is somewhat cumbersome to use. Even where a separate flow regulating valve has been heretofore used to provide a restricted faucet, such valves have been located on the keg or cooler side of the main control or shut-off valve. Structures of this character are unsatisfactory as proper control over the flow of beer is not obtained. Excessive foaming and bubbling is encountered.

In accordance with the present invention we provide a faucet which overcomes the difficulties mentioned above. The faucet which we provide permits the drawing of the beer without any excessive foaming or bubbling and is of such character that the rate of flow is regulated directly by the same handle that permits the beer to flow through the faucet. In the structure which we provide the flow of the beer can be regulated by the faucet handle so that a very thin stream or a heavy stream can be drawn without excessive foaming and without spraying. In addition to these advantages the structure which we provide is of relatively simple construction and requires no packing whatever around the operating handle or the apparatus for regulating the rate of flow of the beer.

In the accompanying drawing we have shown for purposes of illustration only a preferred embodiment of our invention. In the drawing—

Figure 1 is a longitudinal section through the faucet which we provide;

Figure 2 is a section taken along the line II—II of Figure 1; and

Figure 3 is a section taken along the line III—III of Figure 1.

In the structure shown in the drawing, the pipe 2 is connected with a cooler (not shown) which in turn is connected with a keg or other beer container, and the beer is fed from the keg through the cooler to the faucet. The pipe 2 is provided with an enlarged end section 3 forming a chamber 4 in which the shut-off valve for controlling the flow of beer through the faucet is located. The enlarged section 3 is connected to the casing 5 of the faucet by a nut 6 which is provided with a shoulder 7 for cooperation with a shoulder 8 on the end section 3, the nut 6 being threaded on the exterior threads carried by the faucet casing. The main flow control or shut-off valve 9, which may be formed of any suitable resilient material, is positioned in the chamber 4 for cooperation with the seat 10 formed in the casing. The valve member 9 is mounted on one end of the cone-shaped plug 11 which is positioned within the casing of the faucet and forms a regulating valve with the casing as the seat. The valve member 9 is held in position on the end of the plug 11 by a screw 12 which is threaded in the plug. A guide member 13 is secured to the valve member 9 by the screw 12 and this guide member is provided with leg portions 14 adapted to slide along the walls of the chamber 4 so as to maintain the plug 11 and the valve member 9 in alined position.

The plug 11 is tapered toward the outlet of the faucet and cooperates with a similarly tapered bore or opening 15 in the casing 5. As shown in the drawing the plug 11 fits the tapered opening 15 snugly and prevents any flow of beer through the faucet when it is in the position shown in the drawing. When in this position the main shut-off valve 9 is also against the seat 10, and this prevents any flow of beer into the faucet. When the plug 11 is moved to the right as shown in the drawing the control valve 9 is moved from its seat and the plug 11, by virtue of the taper thereof, is moved away from the casing whereby the beer is permitted to flow past the main valve and through the faucet along the outer surface of the plug. During the flow of the beer along the plug 11 the pressure is very materially reduced and the beer after it has passed beyond the plug will flow freely through and out of the faucet without any substantial pressure behind it. This permits the beer to flow from the faucet without foaming or spraying regardless of the extent to which the valve and plug have been moved away from their seats. Also, the movement of the plug longitudinally along the bore of the faucet regulates the rate of flow so that a flow of any desired character can be obtained.

The plug 11 and the shut-off valve 9 are operated by a handle 16 which is pivotally mounted on a pin 17 mounted in the upwardly extending portion 18 of the casing. One end of the lever 16 extends downwardly into the faucet and cooperates with the stem 18 which is formed as an extension on the plug 11. The stem 18 is provided with a longitudinal slot 19 in which the lower end 20 of the lever 16 is positioned. The stem 18 is also provided with leg portions 21 which rest upon the walls of the faucet passageway and aid in maintaining the plug in appropriate alined position relative to the conical bore of the casing.

The pivot pin 17 upon which the handle 16 is mounted is secured in the upwardly extending portion 18 of the casing by the enlarged threaded portion 24 which is adapted to cooperate with threads formed in the one opening through which the pivot pin extends.

The front part of the faucet casing adjacent the outlet is elevated with respect to the main passageway through the faucet so as to provide a weir 22 over which the beer must pass in order to flow through the outlet 23. This raised portion provides a trap 25 through which the beer must flow and this aids in maintaining an even flow through the faucet.

It will be apparent from the description above that movement of the handle 16 in a counterclockwise direction to the position indicated in chain lines will move the main control valve and the plug 11 to the position indicated in dotted lines. This permits the beer to flow past the main valve, along the plug, and into the trap 25. As soon as sufficient beer has flowed through the faucet to reach the level of the outer end of the trap the beer will flow from the faucet through the opening 23. It will be apparent that this flow can be regulated by appropriate positioning of the plug 11 and that the beer which flows from the faucet opening 23 has been relieved of the pressure prevailing on the line side of the plug 11. The plug 11 positioned between the faucet opening and the control valve provides an expansion chamber so that as the beer flows along the plug the pressure behind it is materially reduced. This, coupled with the trap provided at the fore part of the faucet, permits the beer to be drawn at any desired rate without foaming or spraying.

It will also be apparent from what has been stated above that the parts are so arranged that no packing whatever is necessary around the point where the operating handle extends into the faucet. As a matter of fact, this portion of the faucet can be so arranged that any excess gas in the faucet which may tend to cause foaming or spraying can be relieved by escaping along the handle.

While we have shown and described a preferred embodiment of our invention, it will be understood that we do not intend to be limited to the device shown and described as our invention may be otherwise embodied within the scope of the appended claims.

We claim:

1. A faucet for dispensing liquids comprising a casing having an inlet, an outlet and a conical bore therebetween, a main shut-off valve for controlling the flow of liquid through the inlet, a cone-shaped plug cooperating with the conical bore to open and close the same for regulating the flow of liquid therethrough, the bore and plug being located between the main valve and the outlet and the plug being movable longitudinally of the casing, an operating stem connected with the plug and shut-off valve, and a lever cooperating with the stem for operating the plug and shut-off valve, said casing being formed to provide a liquid trap between the plug and the outlet.

2. A faucet for dispensing liquids comprising a casing having an inlet, an outlet and a passageway therebetween, a portion of said passageway having a conical bore tapering toward the outlet, a main shut-off valve for controlling the flow of liquid through the inlet, a cone-shaped plug tapering toward said outlet cooperating with the conical bore for regulating the flow of liquid therethrough, said conical bore and plug being located between the shut-off valve and the outlet, and means for moving the shut-off valve and the plug longitudinally of said bore in the direction from which the liquid enters the casing to open the valve and in the direction of flow of the liquid for closing the valve.

3. A faucet for dispensing liquids comprising a casing having an inlet, an outlet and a passageway therebetween, a portion of said passageway having a conical bore, a main shut-off valve for controlling the flow of liquid through the inlet, a cone-shaped plug fitted within the conical bore for regulating the flow of liquid therethrough, said conical bore and plug being located between the shut-off valve and the outlet, an operating stem, a lever pivoted on the casing and connected with said stem for operating the plug and shut-off valve, and a weir between the plug and outlet to provide a liquid trap therebetween.

4. A faucet for dispensing liquids comprising a casing having an inlet, an outlet and a passageway therebetween, a portion of said passageway having a conical bore, a main shut-off valve for controlling the flow of liquid through the inlet, a cone-shaped plug cooperating with the conical bore for regulating the flow of liquid therethrough, said conical bore and plug being located between the shut-off valve and the outlet, said casing being formed to provide a liquid trap between the plug and the outlet, and means for moving the plug longitudinally in said casing and for operating the shut-off valve simultaneously.

5. A faucet for dispensing liquids comprising a casing having an inlet, an outlet, and a passageway therebetween, a main shut-off valve for controlling the flow of liquid through the inlet, a plug cooperating with the passageway for restricting the flow of liquid therethrough, said plug being located between the main shut-off valve and the outlet and being movable longitudinally of the passageway, and an operating stem connected with the plug and shut-off valve for operating them to regulate the flow of liquid through the faucet, said casing being formed to provide a liquid trap between the plug and the outlet.

6. A faucet for dispensing liquids comprising a casing having an inlet, an outlet, and a passageway therebetween, a main shut-off valve for controlling the flow of liquid through the inlet, a plug cooperating with the passageway for restricting the flow of liquid therethrough, said plug being located between the main shut-off valve and the outlet and being movable longitudinally of the passageway, and means connected with the plug and shut-off valve for moving them in the direction from which the liquid enters the casing to open the shut-off valve and in the reverse direction to close said valve.

7. A faucet for dispensing liquids comprising a casing having an inlet, an outlet, and a passageway therebetween, a main shut-off valve for controlling the flow of liquid through the inlet, a seat for said valve, a plug cooperating with the passageway for restricting the flow of liquid therethrough, said plug being located between the main shut-off valve and the outlet and being movable longitudinally of the passageway, and means connected with the plug and shut-off valve for moving them longitudinally of the passageway to open and close the valve, said means, valve and seat being arranged so that movement of the valve in the direction from which the liquid enters the casing opens the valve and movement in the reverse direction closes the valve.

8. A faucet for dispensing liquids comprising a casing having an inlet, an outlet, and a passageway therebetween, said casing being formed to provide a valve seat, a main shut-off valve cooperating with said seat for controlling the flow of liquid through the casing, a plug cooperating with the passageway for restricting the flow of liquid therethrough, said plug being located between the main shut-off valve and the outlet and being movable longitudinally of the passageway, and means connected with the plug and shut-off valve for moving them longitudinally of the passageway to open and close the valve and to regulate the flow of liquid, said means, valve, valve seat and plug being arranged so that movement of the valve in the direction from which the liquid enters the casing opens the valve and movement in the reverse direction closes the valve.

FRANK WELTY.
RAYMOND D. WELTY.